US010640129B2

(12) United States Patent
Emura et al.

(10) Patent No.: US 10,640,129 B2
(45) Date of Patent: May 5, 2020

(54) DRIVING ASSISTANCE METHOD AND DRIVING ASSISTANCE DEVICE USING SAME, DRIVING ASSISTANCE SYSTEM

(71) Applicant: Panasonic Intellectual Property Management Co., Ltd., Osaka (JP)

(72) Inventors: Koichi Emura, Kanagawa (JP); Eriko Ohdachi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/314,843

(22) PCT Filed: Jun. 28, 2017

(86) PCT No.: PCT/JP2017/023722
§ 371 (c)(1),
(2) Date: Jan. 2, 2019

(87) PCT Pub. No.: WO2018/008488
PCT Pub. Date: Jan. 11, 2018

(65) Prior Publication Data
US 2019/0256108 A1    Aug. 22, 2019

(30) Foreign Application Priority Data
Jul. 7, 2016    (JP) .................................. 2016-135492

(51) Int. Cl.
*B60W 50/14*    (2020.01)
*G06K 9/00*    (2006.01)
(Continued)

(52) U.S. Cl.
CPC ............ *B60W 50/14* (2013.01); *B60W 40/02* (2013.01); *G06K 9/00825* (2013.01); *G08G 1/09* (2013.01);
(Continued)

(58) Field of Classification Search
CPC .......... B60W 50/14; B60W 2050/146; B60W 40/02; G06K 9/00825; B60R 21/00
(Continued)

(56) References Cited

U.S. PATENT DOCUMENTS

| 8,451,108 B2 * | 5/2013 | Kohno | B60K 35/00 340/438 |
| 2016/0052394 A1 | 2/2016 | Yamada | |
| 2018/0118208 A1 * | 5/2018 | Inoguchi | B60W 30/143 |

FOREIGN PATENT DOCUMENTS

| JP | 2008-296628 A | 12/2008 |
| JP | 2013-218571 A | 10/2013 |

(Continued)

OTHER PUBLICATIONS

International Search Report of PCT application No. PCT/JP2017/023722 dated Sep. 26, 2017.

*Primary Examiner* — John A Tweel, Jr.
(74) *Attorney, Agent, or Firm* — Seed IP Law Group LLP

(57) ABSTRACT

A signal recognition instruction receiving unit receives an instruction to recognize signal information in a traffic signal from an automatic driving control device. A signal information recognizer executes recognition processing for the signal information on an image from a sensor and information from a wireless device when the signal recognition instruction receiving unit receives the instruction. An image output unit outputs, to a notification device, start information indicating that the signal information recognizer starts the recognition processing for the signal information.

11 Claims, 7 Drawing Sheets

(51) Int. Cl.
- *B60W 40/02* (2006.01)
- *G08G 1/09* (2006.01)
- *B60R 21/00* (2006.01)

(52) U.S. Cl.
CPC ........ *B60R 21/00* (2013.01); *B60W 2050/146* (2013.01)

(58) Field of Classification Search
USPC ..................................................... 340/425.5
See application file for complete search history.

(56) References Cited

FOREIGN PATENT DOCUMENTS

| | | |
|---|---|---|
| JP | 2016-045705 A | 4/2016 |
| JP | 2016-085651 A | 5/2016 |

\* cited by examiner

DRIVING ASSISTANCE METHOD AND DRIVING ASSISTANCE DEVICE USING SAME, DRIVING ASSISTANCE SYSTEM

This application is a U.S. national stage application of the PCT International Application No. PCT/JP2017/023722 filed on Jun. 28, 2017, which claims the benefit of foreign priority of Japanese patent application No. 2016-135492 filed on Jul. 7, 2016, the contents all of which are incorporated herein by reference.

TECHNICAL FIELD

The present invention relates to a vehicle, a driving assistance method adopted for the vehicle and a driving assistance device using the driving assistance method, a driving assistance system, an automatic driving control device, and a program.

BACKGROUND ART

In order to assist driving, a recognition object is recognized based on a surrounding image of the vehicle, and a user is notified of a recognition result. In the case that the recognition object is traffic signal display, the user is notified that the vehicle can be started when a situation change to advancing possibility display is recognized (for example, see PTL 1).

CITATION LIST

Patent Literature

PTL 1: Unexamined Japanese Patent Publication No. 2013-218571

SUMMARY OF THE INVENTION

An object of the present invention is to provide a technique of notifying the user of an action situation of recognition processing for the signal information.

According to one aspect of the present invention, a driving assistance device includes: a signal recognition instruction receiving unit that receives an instruction to recognize signal information in a traffic signal; a signal information recognizer that executes recognition processing for the signal information when the signal recognition instruction receiving unit receives the instruction; and an image output unit that outputs start information indicating that the signal information recognizer starts the recognition processing for the signal information.

Another aspect of the present invention provides a driving assistance system. The driving assistance system includes: a signal recognition instruction receiving unit that receives an instruction to recognize signal information in a traffic signal; a signal information recognizer that executes recognition processing for the signal information when the signal recognition instruction receiving unit receives the instruction; and a display that displays start information indicating that the signal information recognizer starts the recognition processing for the signal information.

Still another aspect of the present invention provides an automatic driving control device. The automatic driving control device includes: a signal recognition instruction receiving unit that receives an instruction to recognize signal information in a traffic signal; a signal information recognizer that executes recognition processing for the signal information when the signal recognition instruction receiving unit receives the instruction; an image output unit that outputs start information indicating that the signal information recognizer starts the recognition processing for the signal information; and an automatic driving control unit that controls automatic driving of a vehicle based on a result of the recognition processing for the signal information.

Still another aspect of the present invention provides a vehicle. The vehicle includes a driving assistance device. The driving assistance device includes: a signal recognition instruction receiving unit that receives an instruction to recognize signal information in a traffic signal; a signal information recognizer that executes recognition processing for the signal information when the signal recognition instruction receiving unit receives the instruction; and an image output unit that outputs start information indicating that the signal information recognizer starts the recognition processing for the signal information.

Still another aspect of the present invention provides a driving assistance method. The driving assistance method includes: receiving an instruction to recognize signal information in a traffic signal; executing recognition processing for the signal information when the instruction is received; and outputting start information indicating that the recognition processing for the signal information is started.

Any desired combinations of the above described components and the features in which the representation of the present invention is converted between the devices, systems, methods, programs, non-transitory recording media having the programs recorded on the non-transitory recording media, vehicles having the present device mounted on the vehicles, or other entities are still effective as other aspects of the present invention.

According to present invention, the user can be notified of the action situation of the recognition processing for the signal information.

DESCRIPTION OF EMBODIMENT

Figure 1:
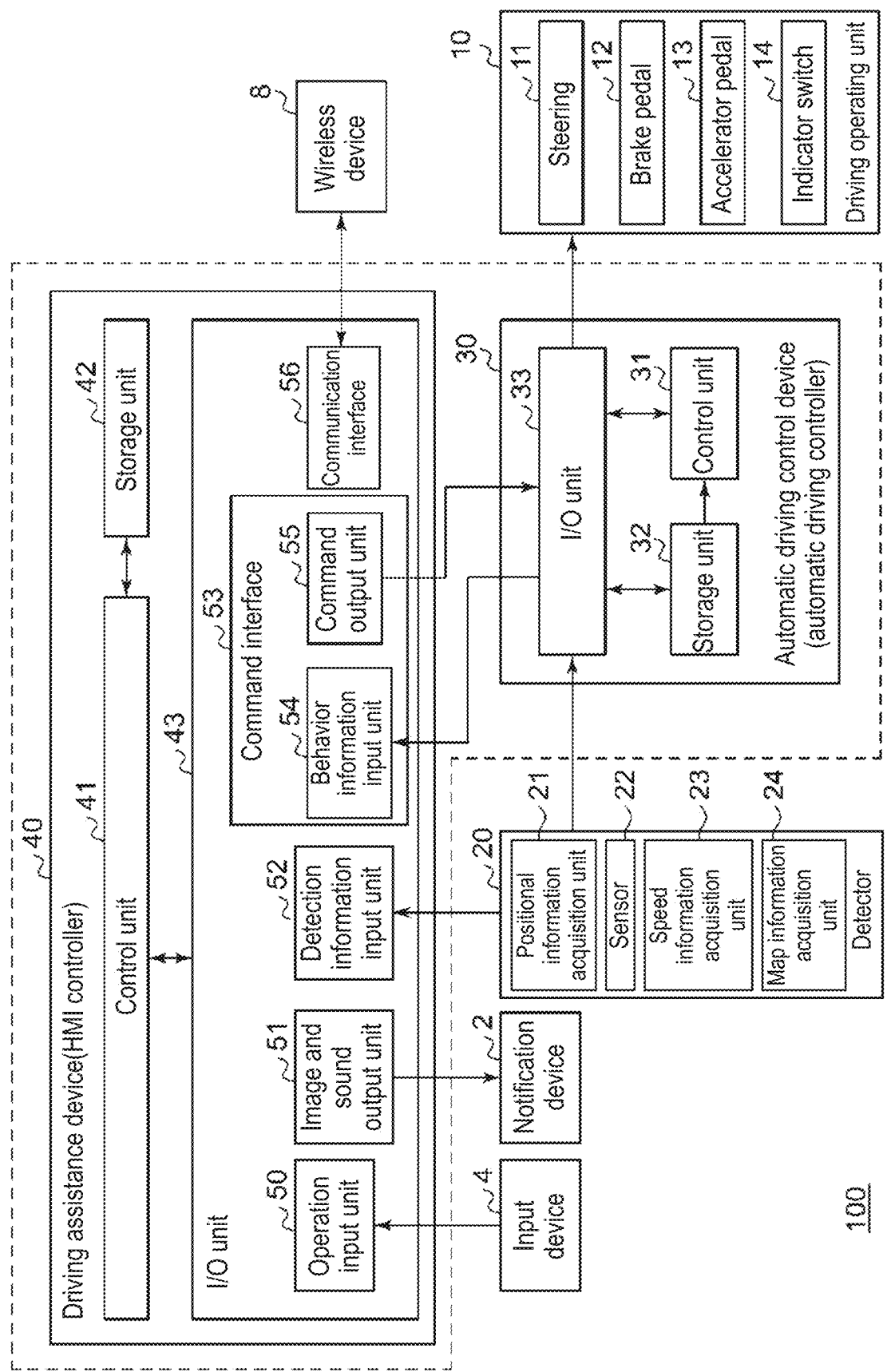
FIG. 1 is a diagram illustrating a configuration of a vehicle according to an exemplary embodiment.

Prior to describing exemplary embodiments of the present invention, problems found in a conventional device will be described briefly. In the vehicle that can execute the automatic driving, information (hereinafter, referred to as "signal information") indicated by a traffic signal is recognized, and traveling and stop are controlled based on a recognition result. Typically such recognition processing is automatically executed. Meanwhile, a driver and the like cannot recognize whether the recognition processing for the signal information is executed, and may have anxiety. For this reason, there is a demand of reducing the anxiety of the driver and the like in the vehicle that can execute the automatic driving.

Prior to specific description of the present invention, an outline of the present invention will be described herein. An exemplary embodiment relates to notification of information in automatic driving of a vehicle. In particular, the exemplary embodiment relates to a device (hereinafter, also referred to as a "driving assistance device") that controls a human machine interface (HMI) that exchanges information about a driving behavior of the vehicle with an occupant (for example, a driver) of the vehicle. The "driving behavior" includes an operating state such as steering and braking during traveling and stopping of the vehicle, or a control content relating to the automatic driving control. Examples of the driving behavior include constant speed traveling, acceleration, deceleration, temporary stop, stop, lane change, course change, right or left turn, parking, and the like. In addition, examples of the driving behavior may include cruising (running while keeping a lane and maintaining a vehicle speed), lane keeping, following a preceding vehicle, stop and go during following, lane change, passing, a response to a merging vehicle, crossover (interchange) including entry and exit from an expressway, merging, response to a construction zone, response to an emergency vehicle, response to an interrupting vehicle, response to lanes exclusive to right and left turns, interaction with a pedestrian and a bicycle, avoidance of an obstacle other than a vehicle, response to a sign, response to restrictions of right and left turns and a U turn, response to lane restriction, response to one-way traffic, response to a traffic sign, response to an intersection and a roundabout, and the like.

In the case that the vehicle executes the automatic driving, the signal information that is information indicated by a combination of colors turned on in the traffic signal is recognized, and the driving behavior is determined while a recognition result is reflected. For example, in the case that the signal information indicates that a red light is turned on, namely, "stop", stop is determined as the driving behavior. The signal information is also called expression information. In order to recognize the signal information, image recognition processing is executed on an image captured by a camera facing toward the front of the vehicle. As described above, because the recognition processing is automatically executed, the driver and the like cannot recognize whether the recognition processing is executed, and may have the anxiety. In the exemplary embodiment, in order to reduce the anxiety of the driver and the like, an automatic driving control device that controls the automatic driving determines a traveling route while referring to map information. The map information is accompanied by information about a position (hereinafter, referred to as a "traffic signal position") where the traffic signal is installed. The automatic driving control device outputs a recognition instruction to the driving assistance device when approaching the traffic signal position, and the driving assistance device starts the recognition processing on the image when receiving the recognition instruction. When starting the recognition processing, the driving assistance device displays start information indicating that the recognition processing is started. When ending the recognition processing, the driving assistance device displays a result of the recognition processing.

Hereinafter, the exemplary embodiment of the present invention will be described in detail with reference to the drawings. The exemplary embodiments described below are only illustrative, and do not limit the scope of the present invention.

FIG. 1 illustrates a configuration of vehicle 100 of the exemplary embodiment, and particularly illustrates a configuration relating to an automatic driving vehicle. Vehicle 100 can travel in an automatic driving mode, and includes notification device 2, input device 4, wireless device 8, driving operating unit 10, detector 20, automatic driving control device 30, and driving assistance device 40. The devices in FIG. 1 may be connected by a dedicated line or wired communication such as a controller area network (CAN). The devices may be connected by wired communication or wireless communication such as a universal serial bus (USB), Ethernet (registered trademark), Wi-Fi (registered trademark), and Bluetooth (registered trademark).

Notification device 2 notifies the driver of information about traveling of vehicle 100. Notification device 2 is a display that displays information, such as a light emitter, for example, a light emitting diode (LED) provided on a car navigation system, a head-up display, a center display, a steering wheel, a pillar, a dashboard, and a vicinity of an instrument panel, all of these elements are installed in a vehicle interior. Notification device 2 may be a speaker that converts information into sound to notify the driver, or a vibrator provided at a position (for example, a seat of the driver and a steering wheel) where the driver can sense a vibration. Notification device 2 may be a combination of these elements. Input device 4 is a user interface device that receives an operation input executed by an occupant. For example, input device 4 is a controller such as a touch panel, a lever, a button, a switch, a joystick, and a volume device, a sensor such as a camera that recognizes a gesture in a noncontact manner, a sensor such as a microphone that recognizes sound, and a combination thereof, and input device 4 receives information about the automatic driving of own vehicle input by the driver. Input device 4 may receive an operation signal for switching between the automatic driving and manual driving. Input device 4 outputs the received information as an operation signal to driving assistance device 40.

Figure 2:
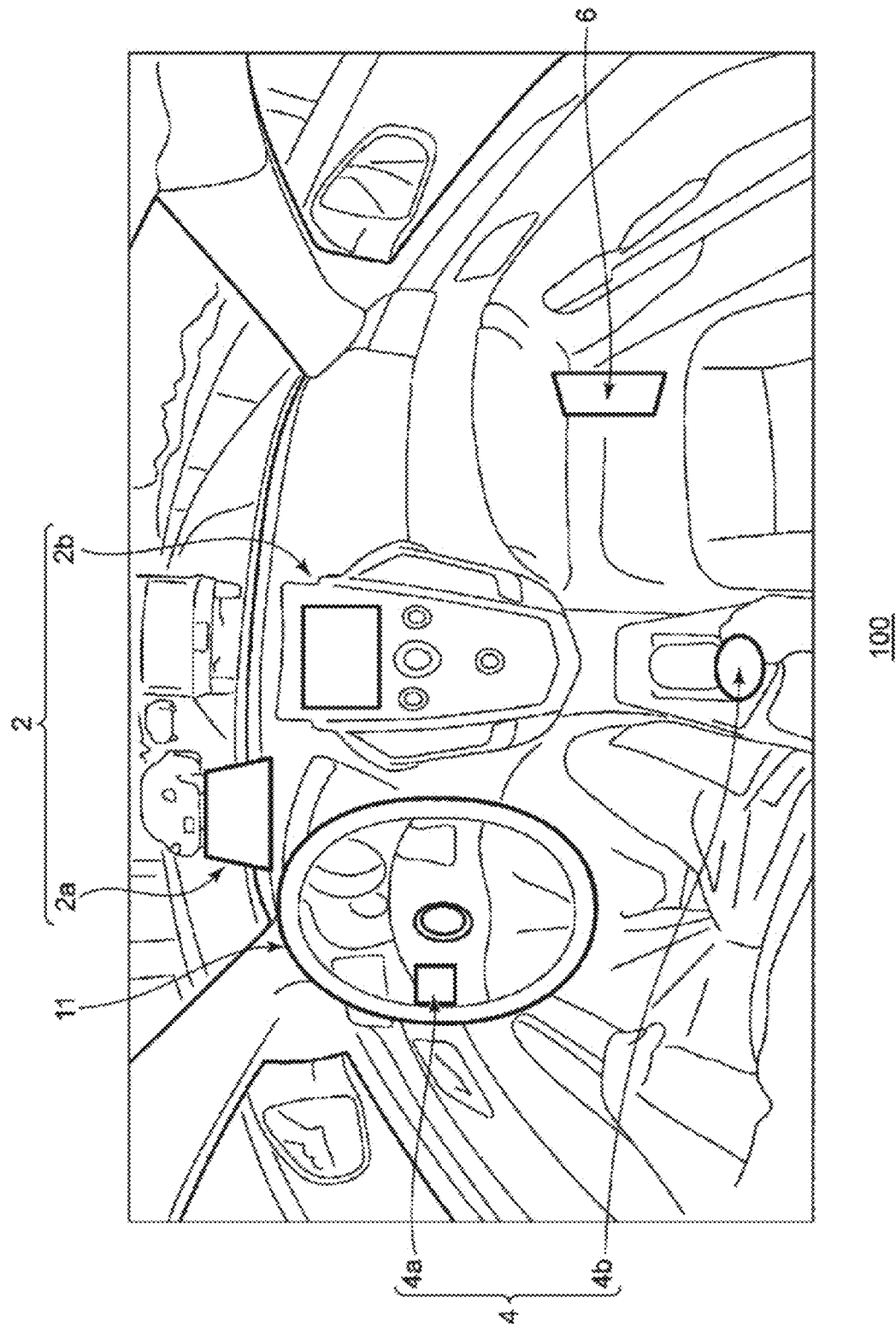
FIG. 2 is a view schematically illustrating an interior of the vehicle in FIG. 1.

FIG. 2 schematically illustrates an interior of vehicle 100. Notification device 2 may be head-up display (HUD) 2a or center display 2b. Input device 4 may be first operating unit 4a provided in steering 11 or second operating unit 4b provided between a driver seat and a passenger seat. Notification device 2 and input device 4 may be integrated with each other. For example, notification device 2 and input device 4 may be mounted as a touch panel display. Speaker 6 that presents sound information about the automatic driving to the occupant may be further provided in vehicle 100. In this case, driving assistance device 40 may cause notification device 2 to display an image indicating the information about the automatic driving, and in addition to or in place of this configuration, may output sound indicating the information about the automatic driving from speaker 6. The description returns to FIG. 1.

Wireless device 8 is compatible with a mobile phone communication system, a wireless metropolitan area network (WMAN), or the like, and conducts wireless communication with a data server, an infrastructure, other vehicles, a pedestrian, or the like. Wireless device 8 may be compatible with intelligent transport systems (ITS).

Driving operating unit 10 includes steering 11, brake pedal 12, accelerator pedal 13, and indicator switch 14. Steering 11, brake pedal 12, accelerator pedal 13, and indicator switch 14 can electronically be controlled by a steering ECU (electronic control unit), a brake ECU, an engine ECU and a motor ECU, and an indicator controller, respectively. In the automatic driving mode, the steering ECU, the brake ECU, the engine ECU, and the motor ECU drive actuators according to control signals supplied from automatic driving control device 30. The indicator controller turns on or off an indicator lamp according to the control signal supplied from automatic driving control device 30.

Detector 20 detects a surrounding situation and a traveling state of vehicle 100. For example, detector 20 detects a speed of vehicle 100, a relative speed of a preceding vehicle with respect to vehicle 100, a distance between vehicle 100 and the preceding vehicle, a relative speed of a vehicle traveling in an adjacent lane with respect to vehicle 100, a distance between vehicle 100 and the vehicle traveling in the adjacent lane, and positional information about vehicle 100. Detector 20 outputs detected various pieces of information (hereinafter, referred to as "detection information") to automatic driving control device 30. Detector 20 may output the detection information to driving assistance device 40 through automatic driving control device 30, or directly output the detection information to driving assistance device 40. Detector 20 includes positional information acquisition unit 21, sensor 22, speed information acquisition unit 23, and map information acquisition unit 24.

Positional information acquisition unit 21 acquires a current position of vehicle 100 from a global navigation satellite system (GNSS) receiver. Sensor 22 is a general term for various sensors that detect an outside situation of the vehicle and the state of vehicle 100. For example, a camera, a millimeter-wave radar, a light detection and ranging laser imaging detection and ranging (LIDAR), a sonar, a temperature sensor, an atmospheric pressure sensor, a humidity sensor, and an illuminance sensor are mounted as the sensor that detects the outside situation of the vehicle. The outside situation of the vehicle includes a situation of a road where the own vehicle travels, which includes lane information, an environment including weather, a surrounding situation of the own vehicle, and other vehicles (such as other vehicles traveling in the adjacent lane) present nearby. Any information about the outside of the vehicle that can be detected by sensor 22 may be used. For example, an acceleration sensor, a gyroscope sensor, a geomagnetism sensor, and an inclination sensor are mounted as the sensor 22 that detects the state of vehicle 100.

Speed information acquisition unit 23 acquires a current speed of vehicle 100 from a vehicle speed sensor. Map information acquisition unit 24 acquires map information about a region around the current position of vehicle 100 from a map database. The map database may be recorded in a recording medium in vehicle 100, or downloaded from a map server through a network at a time of use.

Automatic driving control device 30 is an automatic driving controller having an automatic driving control function, and determines a behavior of vehicle 100 in automatic driving. Automatic driving control device 30 includes control unit 31, storage unit 32, and input and output (I/O) unit 33. A configuration of control unit 31 can be implemented by cooperation between a hardware resource and a software resource or only the hardware resource. Hardware resources that can be used include a processor, a read only memory (ROM), a random access memory (RAM), and other large scale integrations (LSIs). Software resources that can be used include programs such as an operating system, applications, and firmware. Storage unit 32 includes a nonvolatile recording medium such as a flash memory. I/O unit 33 executes communication control according to various communication formats. For example, I/O unit 33 outputs information about the automatic driving to driving assistance device 40, and receives a control command from driving assistance device 40. I/O unit 33 receives the detection information from detector 20.

Control unit 31 applies a control command input from driving assistance device 40 and various pieces of information collected from detector 20 or various ECUs to an automatic driving algorithm, and calculates a control value in order to control an automatic control object such as an accelerator throttle opening and a steering angle of vehicle 100. Control unit 31 transmits the calculated control value to the ECU or the controller of the corresponding control object. In the exemplary embodiment, control unit 31 transmits the calculated control value to the steering ECU, the brake ECU, the engine ECU, and the indicator controller. For an electrically driven vehicle or a hybrid car, control unit 31 transmits the control value to the motor ECU instead of or in addition to the engine ECU.

Driving assistance device 40 is an HMI controller that executes an interface function between vehicle 100 and the driver, and includes control unit 41, storage unit 42, and I/O unit 43. Control unit 41 executes various pieces of data processing such as HMI control. Control unit 41 can be implemented by cooperation between the hardware resource and the software resource or only the hardware resource. A processor, a ROM, a RAM, and other LSIs can be used as the hardware resource, and programs such as an operating system, applications, and firmware can be used as the software resource.

Storage unit 42 is a storage area that stores data that is looked up or updated by control unit 41. For example, storage unit 42 is configured with a nonvolatile recording medium such as a flash memory. I/O unit 43 executes various kinds of communication control according to various kinds of communication formats. I/O unit 43 includes operation input unit 50, image and sound output unit 51, detection information input unit 52, command interface (IF) 53, and communication IF 56.

Operation input unit 50 receives an operation signal generated by operation executed on input device 4 by the driver, the occupant, or a user outside vehicle from input device 4, and outputs the operation signal to control unit 41. Image and sound output unit 51 outputs image data or a sound message, which is generated by control unit 41, to notification device 2, and causes notification device 2 to display the image data or the sound message. Detection information input unit 52 receives information (hereinafter referred to as "detection information"), which is a result of detection processing of detector 20 and indicates a current surrounding situation and a traveling state of vehicle 100, from detector 20, and outputs the received information to control unit 41.

Command IF 53 executes interface processing with automatic driving control device 30, and includes behavior information input unit 54 and command output unit 55. Behavior information input unit 54 receives information about the automatic driving of vehicle 100, the information being transmitted from automatic driving control device 30, and outputs the received information to control unit 41. Command output unit 55 receives a control command instructing automatic driving control device 30 on a mode of the automatic driving from control unit 41, and transmits the command to automatic driving control device 30.

Communication IF 56 executes interface processing with wireless device 8. Communication IF 56 transmits the data, which is output from control unit 41, to wireless device 8, and wireless device 8 transmits the data to an external device. Communication IF 56 receives data transmitted from the external device, the data being transferred by wireless device 8, and outputs the data to control unit 41.

In this case, automatic driving control device 30 and driving assistance device 40 are configured as individual devices. As a modification, automatic driving control device 30 and driving assistance device 40 may be integrated into one controller as indicated by a broken line in FIG. 1. In other words, one automatic driving control device may have both the functions of automatic driving control device 30 and driving assistance device 40 in FIG. 1. Driving assistance device 40 and notification device 2 may be united as a "driving assistance system".

Figure 3:
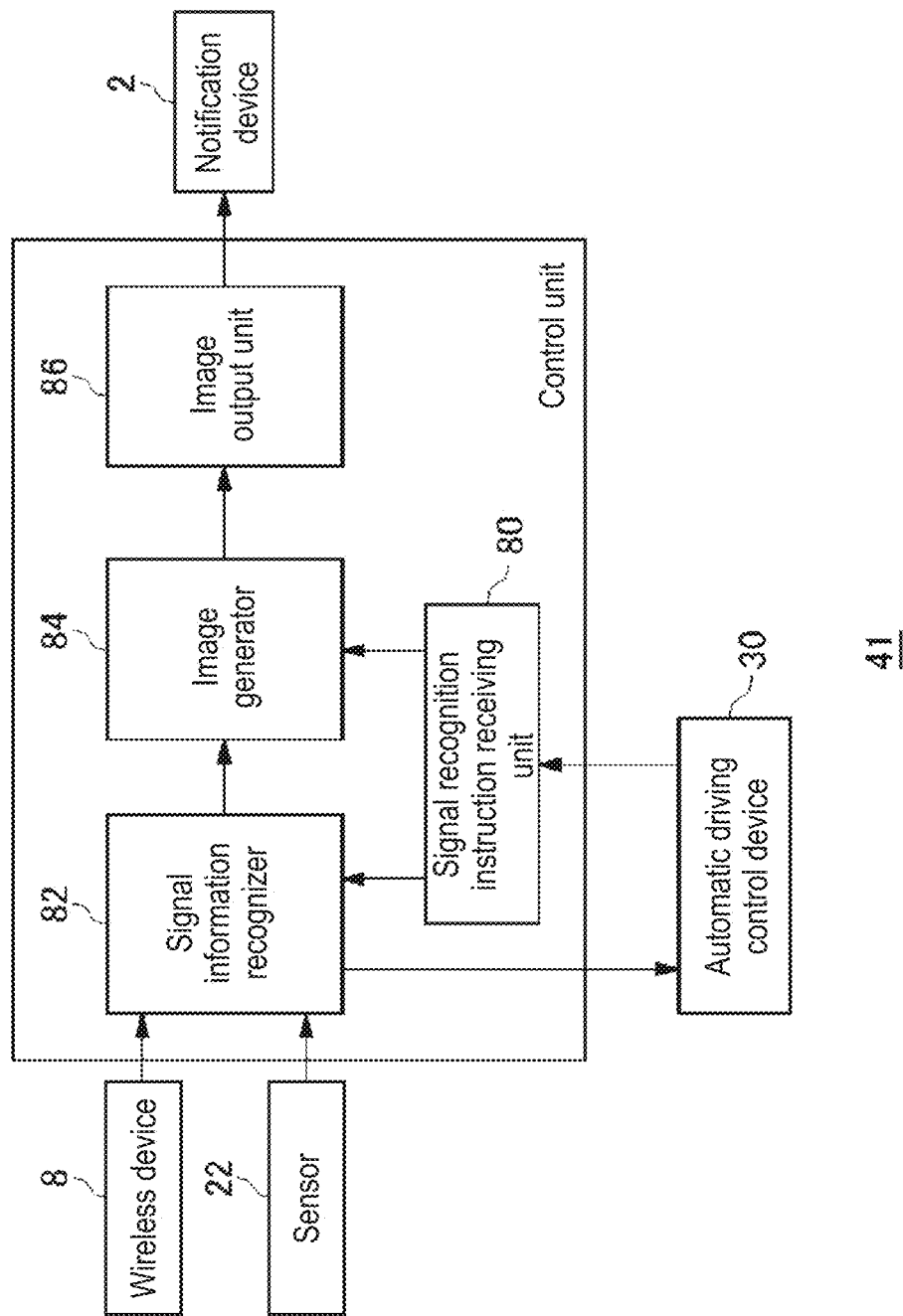
FIG. 3 is a diagram illustrating a configuration of a control unit in FIG. 1.

FIG. 3 illustrates a configuration of control unit 41. Control unit 41 includes signal recognition instruction receiving unit 80, signal information recognizer 82, image generator 84, and image output unit 86. In FIG. 3, although automatic driving control device 30, wireless device 8, sensor 22, and notification device 2 that are a configuration having a high relevance with processing of the exemplary embodiment are also illustrated, I/O unit 43 and the like are omitted to clarify the drawing.

Automatic driving control device 30 determines a behavior of vehicle 100 in the automatic driving by executing automatic driving control. At this point, automatic driving control device 30 determines the traveling route based on the map information acquired by map information acquisition unit 24 (not illustrated). The map information is accompanied by the information about the traffic signal position. Automatic driving control device 30 outputs the instruction to recognize the signal information in the traffic signal to control unit 41 in the case that the current position of vehicle 100 enters a predetermined range from the traffic signal position. At this point, the predetermined range is set so as to become longer than a distance in which the signal information can be recognized in the recognition processing.

Signal recognition instruction receiving unit 80 receives an instruction to recognize the signal information from automatic driving control device 30. Signal recognition instruction receiving unit 80 notifies signal information recognizer 82 that the instruction to recognize the signal information is received. Signal information recognizer 82 executes recognition processing for the signal information in the case that the notification is received from signal recognition instruction receiving unit 80. At this point, signal information recognizer 82 notifies image generator 84 of the start of the recognition processing in timing of starting the recognition processing for the signal information.

Figure 4A:
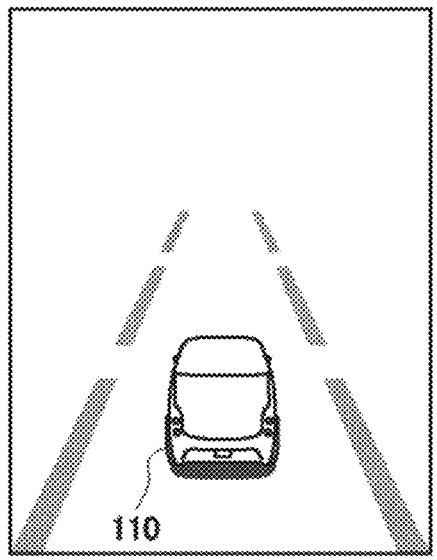
FIG. 4A is a view illustrating an image generated by an image generator in FIG. 3.

Image generator 84 generates an image indicating a surrounding situation of vehicle 100. FIGS. 4A to 4F illustrate images generated by image generator 84. FIG. 4A corresponds to the image in the case that the recognition processing for the signal information is not executed. Vehicle icon 110 indicating vehicle 100 is disposed in a central portion of the image. Although omitted in FIG. 4A, information about an obstacle detected by sensor 22 is indicated around vehicle icon 110. FIGS. 4B to 4F are described later, and the description returns to FIG. 3.

Figure 4B:
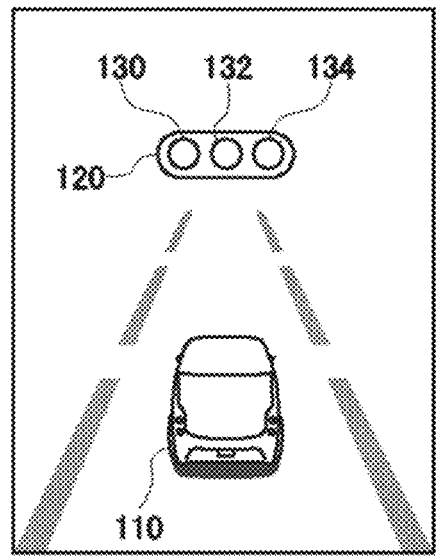
FIG. 4B is a view illustrating an image generated by the image generator in FIG. 3.

In the case that signal information recognizer 82 notifies image generator 84 of the start of the recognition processing, image generator 84 generates the image on which start information indicating that signal information recognizer 82 starts the recognition processing for the signal information is superposed. FIG. 4B corresponds to the image on which the start information is superposed. At this point, the start information is indicated as traffic signal icon 120 having a shape of the traffic signal. Green area 130, yellow area 132, and red area 134 are arranged in traffic signal icon 120. Green area 130, yellow area 132, red area 134 have a circular shape. Green area 130 is an area that is colored in green in the case that the signal information indicates that a green light is turned on, and yellow area 132 is an area that is colored in yellow in the case that the signal information indicates that a yellow light is turned on. Red area 134 is an area that is colored in red in the case that the signal information indicates that a red light is turned on. At this point, only signal information recognizer 82 starts the recognition processing, but the signal information is not recognized. Consequently, for example, green area 130, yellow area 132, and red area 134 are colored in gray. Green area 130, yellow area 132, and red area 134 may be colored in a color except for green, yellow, and red, and the color is not limited to gray. FIGS. 4C to 4F are described later, and the description returns to FIG. 3. Image generator 84 outputs the generated image to image output unit 86.

Image output unit 86 causes notification device 2 to display the image received from image generator 84. As a result, notification device 2 displays the image in FIG. 4A on a display in the case that the recognition processing for the signal information is not started, and displays the image in FIG. 4B on the display in the case that the recognition processing is started. As illustrated in FIG. 4B, the display of traffic signal icon 120 in which green area 130, yellow area 132, and red area 134 are colored in gray corresponds to the display of the start information indicating that signal information recognizer 82 starts the recognition processing for the signal information.

In the case that sensor 22 is a camera, after signal information recognizer 82 receives the notification from signal recognition instruction receiving unit 80, the camera captures the image, and outputs the captured image to signal information recognizer 82 for the purpose of the recognition processing for the signal information signal in signal information recognizer 82. At this point, the camera is disposed at a position where the camera can capture the image in front of vehicle 100. Signal information recognizer 82 recognizes the signal information about the traffic signal by executing image recognition processing on the image from the camera. This recognizes the expression information about the traffic signal, and for example, corresponds to the recognition of the color turned on in the traffic signal. Any known technique is applicable to the image recognition processing, and the description of the image recognition processing will be omitted.

On the other hand, in the case that wireless device 8 is an ITS receiving device such as an optical beacon receiving device, after signal information recognizer 82 receives the notification from signal recognition instruction receiving unit 80, the receiving device receives information included in an optical beacon, and outputs the received information to signal information recognizer 82 for the purpose of the recognition processing for the signal information signal in signal information recognizer 82. For example, the receiving device receives the traffic signal information when the vehicle approaches a position of about 10 m from an optical beacon transmitting device. Signal information recognizer 82 detects the traffic signal information included in the information from the receiving device, and recognizes the signal information about the traffic signal. Signal information recognizer 82 outputs a result of the recognition processing for the signal information to image generator 84 after recognizing the signal information about the traffic signal with respect to at least one of the image from the camera and the information from the receiving device.

Figure 4C:
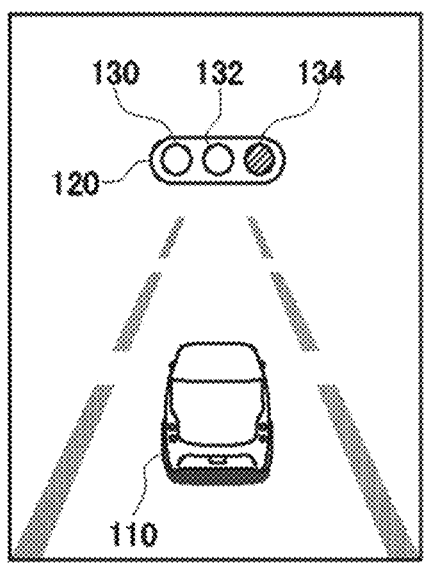
FIG. 4C is a view illustrating an image generated by the image generator in FIG. 3.
Figure 4D:
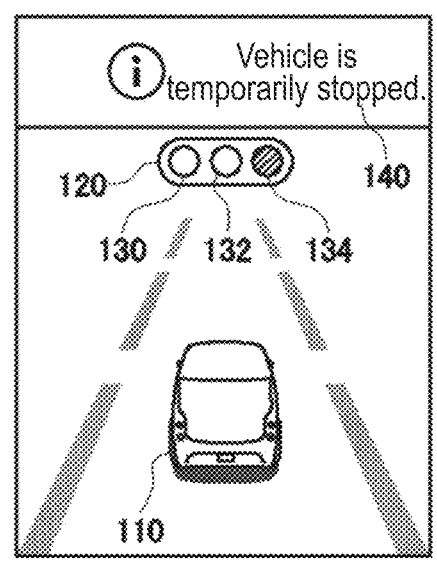
FIG. 4D is a view illustrating an image generated by the image generator in FIG. 3.
Figure 4E:
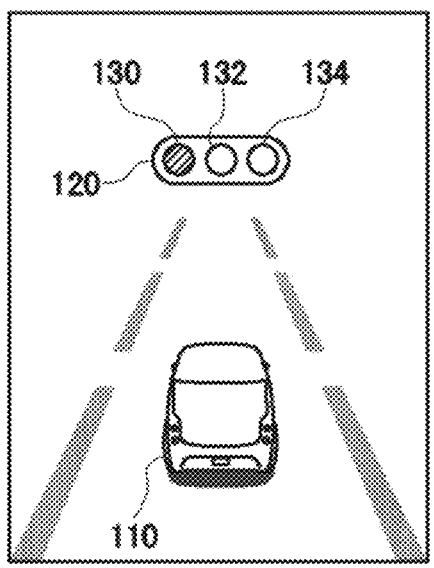
FIG. 4E is a view illustrating an image generated by the image generator in FIG. 3.
Figure 4F:
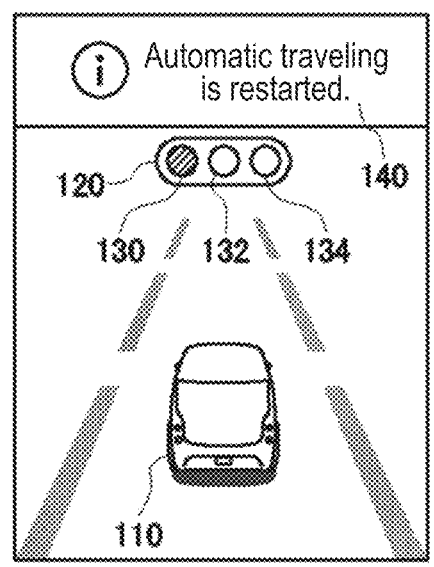
FIG. 4F is a view illustrating an image generated by the image generator in FIG. 3.

Image generator 84 generates the image on which the result of the recognition processing for the signal information is superposed in the case that image generator 84 receives the result of the recognition processing for the signal information from signal information recognizer 82. FIG. 4C corresponds to the image on which the recognition processing result is superposed. In this case, traffic signal icon 120 is indicated similarly to FIG. 4C. One of green area 130, yellow area 132, and red area 134 in traffic signal icon 120 is colored as the recognition processing result. In the case that the red light is turned on as the recognition processing result, red area 134 is colored in red, and green area 130 and yellow area 132 are colored in gray. FIGS. 4D to 4F are described later, and the description returns to FIG. 3. Image output unit 86 causes notification device 2 to display the image in FIG. 4C generated by image generator 84 after causing notification device 2 to display the image in FIG. 4B.

Signal information recognizer 82 outputs the result of the recognition processing for the signal information to automatic driving control device 30 as a control command. Signal information recognizer 82 may output an instruction of "stop" based on the result of the recognition processing for the signal information to automatic driving control device 30 as the control command. Automatic driving control device 30 determines the driving behavior of the vehicle based on the control command. That is, automatic driving control device 30 controls the automatic driving of vehicle 100 based on the result of the recognition processing for the signal information. Automatic driving control device 30 outputs the determined driving behavior of the vehicle to control unit 41 as behavior information. The behavior information corresponds to information about the automatic driving of vehicle 100. Signal recognition instruction receiving unit 80 outputs the behavior information to image generator 84 after receiving the behavior information from automatic driving control device 30.

Image generator 84 generates an image on which the behavior information is superposed after receiving the behavior information from signal recognition instruction receiving unit 80. FIG. 4D corresponds to the image on which the behavior information is superposed. At this point, red area 134 in traffic signal icon 120 is colored similarly to FIG. 4C. Message 140 corresponding to the behavior information is indicated. When the behavior information is "temporary stop", characters "vehicle is temporarily stopped" are indicated as message 140. FIGS. 4E and 4F are described later, and the description returns to FIG. 3. Image output unit 86 causes notification device 2 to display the image in FIG. 4D generated by image generator 84 after causing notification device 2 to display the image in FIG. 4C.

Subsequently, in the case that the recognition processing result in signal information recognizer 82 is changed to the turn-on of the green light, image generator 84 generates the image in FIG. 4E. In this case, green area 130 is colored in green, and yellow area 132 and red area 134 are colored in gray. At this point, message 140 in FIG. 4D is erased. Image output unit 86 displays the image in FIG. 4E on notification device 2 In the case that image generator 84 receives behavior information "start" from automatic driving control device 30 through signal recognition instruction receiving unit 80, image generator 84 generates the image in FIG. 4F. At this point, characters "automatic traveling is restarted" are indicated as message 140 Image output unit 86 causes notification device 2 to display the image in FIG. 4F.

Figure 5:
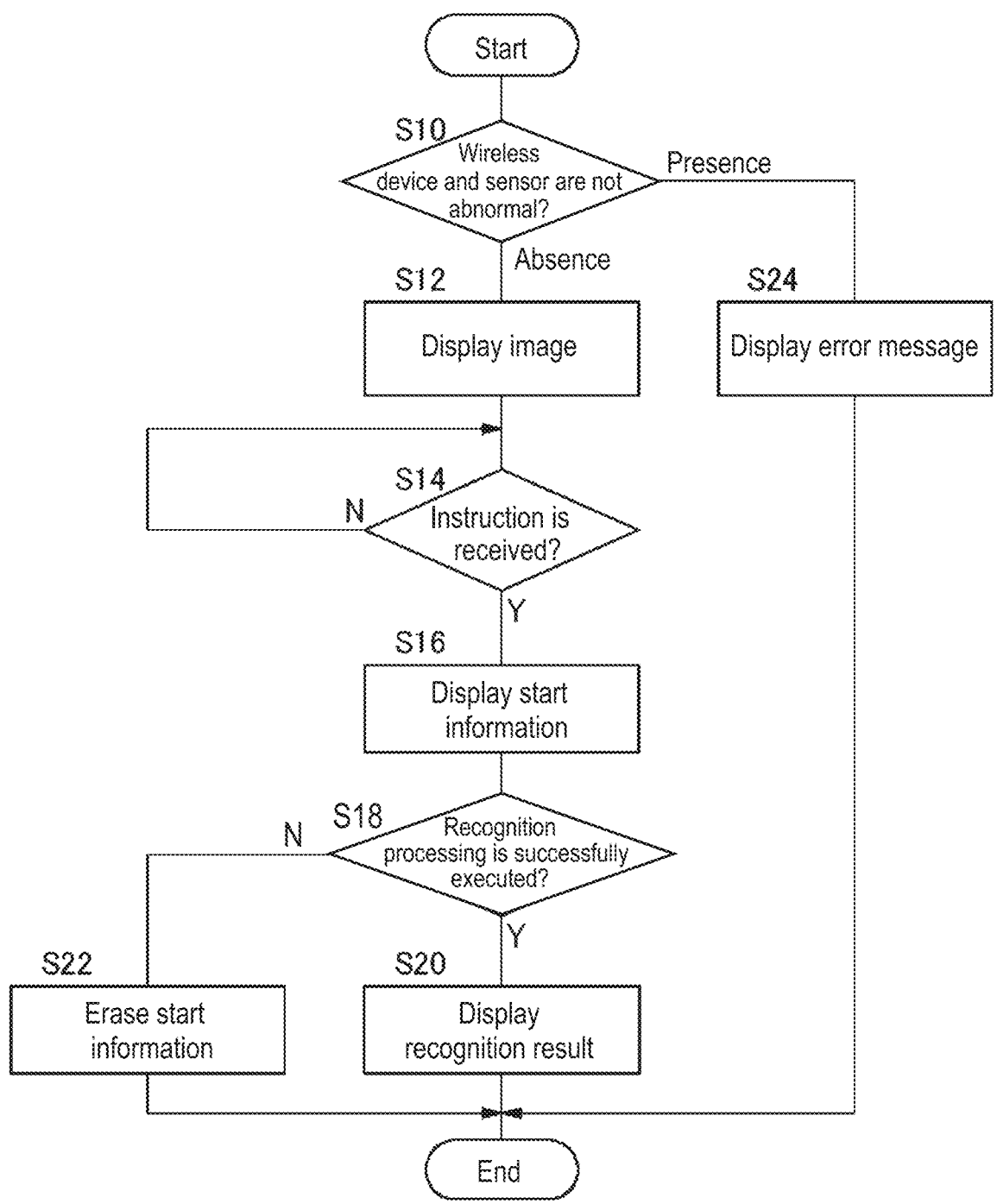
FIG. 5 is a flowchart illustrating an output procedure of a control unit in FIG. 3.

Action of driving assistance device 40 having the above configuration will be described below. FIG. 5 is a flowchart illustrating an output procedure executed by control unit 41. When wireless device 8 and sensor 22 are not abnormal (absence in S10), image output unit 86 causes notification device 2 to display the image in FIG. 4A (S12). When signal recognition instruction receiving unit 80 does not receive the instruction to recognize the signal information from automatic driving control device 30 (N in S14), image output unit 86 waits. After signal recognition instruction receiving unit 80 receives the instruction to recognize the signal information from automatic driving control device 30 (Y in S14), image output unit 86 causes notification device 2 to display the start information such as traffic signal icon 120 in FIG. 4B (S16). When signal information recognizer 82 successfully executes the recognition processing (Y in S18), image output unit 86 causes notification device 2 to display a recognition processing result (S20). When signal information recognizer 82 fails to the recognition processing (N in S18), image output unit 86 erases the start information (S22). When wireless device 8 and sensor 22 are abnormal (presence in S10), image output unit 86 causes notification device 2 to display an error message indicating that the signal information cannot be displayed (S24).

Figure 6:
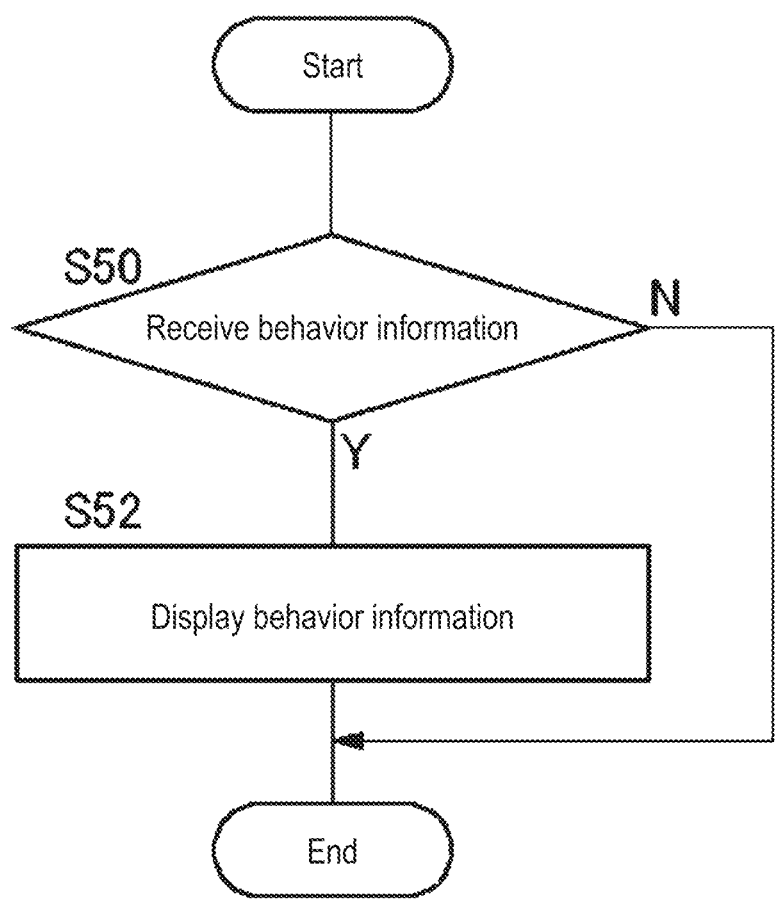
FIG. 6 is a flowchart illustrating another output procedure of the control unit in FIG. 3.

FIG. 6 is a flowchart illustrating another output procedure executed by control unit 41. When signal recognition instruction receiving unit 80 receives the behavior information from automatic driving control device 30 (Y in S50), image output unit 86 causes notification device 2 to display the behavior information (S52). When signal recognition instruction receiving unit 80 does not receive the behavior information from automatic driving control device 30 (N in S50), step 52 is skipped.

According to the exemplary embodiment, the start information indicating that the recognition processing for the signal information is started is output before the result of the recognition processing for the signal information is acquired, so that the driver and the like can be notified of the action situation of the recognition processing for the signal information. The driver and the like are notified of the action situation of the recognition processing for the signal information, the driver and the like can recognize the execution of the recognition processing even if the recognition processing is automatically executed. The driver and the like recognize the execution of the recognition processing, so that the anxiety of the driver and the like can be reduced. The driver and the like can recognize that the state of the traffic signal recognized by the driver and the like is different from the action state of the recognition processing for the signal information, so that the driver can determine what should be monitored or what needs not to be monitored according to the situation, thus giving less anxiety to the driver. The recognition processing result is output subsequent to the start information, so that the driver and the like can be notified of the result in the middle of the recognition processing. The driver and the like can be notified of the information about the driving behavior together with the recognition processing.

In the exemplary embodiment, a graphical icon resembling the traffic signal is used as the start information, but the start information is not limited to the graphical icon resembling the traffic signal. For example, the start information may be a completely different diagram, a character, or presentation by sound.

In the exemplary embodiment, the signal information and the red, green, and yellow states are used. Alternatively, green arrow information or other pieces of information about the traffic signal may be used, more preferably an appropriate combination of pieces of information is presented based on the information about the traffic signal obtained from the map. A state in which the recognition of the traffic signal is unknown may be provided.

While the exemplary embodiment of the present invention has been described above with reference to the drawings, the functions of the above devices and processors can be implemented by a computer program. A computer that implements the above functions through the execution of the program includes an input device such as a keyboard, a mouse, and a touch pad, an output device such as a display and a speaker, a central processing unit (CPU), a storage device such as a ROM, a RAM, a hard disk device, and an solid state drive (SSD), a reading device that reads information from a recording medium such as a digital versatile disk read only memory (DVD-ROM) and a USB memory, and a network card that conducts communication through a network, and the respective elements are connected to one another through a bus.

The reading device reads the program from the recording medium in which the program is recorded, and stores the program in the storage device. Alternatively, the network card communicates with a server device connected to the network, and a program, which implements the respective functions of the above devices and is downloaded from the server device, is stored in the storage device. The CPU copies the program stored in the storage device onto the RAM, and sequentially reads instructions included in the program from the RAM to execute the instructions, thereby implementing the functions of the devices.

An outline of a first aspect of the present invention is as follows. According to one aspect of the present invention, a driving assistance device includes: a signal recognition instruction receiving unit that receives an instruction to recognize signal information in a traffic signal; a signal information recognizer that executes recognition processing for the signal information when the signal recognition instruction receiving unit receives the instruction; and an image output unit that outputs start information indicating that the signal information recognizer starts the recognition processing for the signal information.

According to this aspect, the start information indicating that the recognition processing for the signal information is started is output before the result of the recognition processing for the signal information is acquired, so that the driver and the like can be notified of the action situation of the recognition processing for the signal information.

The image output unit may output the result of the recognition processing for the signal information after outputting the start information. In this case, the recognition processing result is output subsequent to the start information, so that the driver and the like can be notified of the result in the middle of the recognition processing.

The signal recognition instruction receiving unit may receive driving behavior information in a vehicle in which the result of the recognition processing for the signal information is reflected, and the image output unit may output the driving behavior information in the vehicle. In this case, the driver and the like can be notified of the information about the driving behavior together with the recognition processing.

Another aspect of the present invention provides a driving assistance system. The driving assistance system includes: a signal recognition instruction receiving unit that receives an instruction to recognize signal information in a traffic signal; a signal information recognizer that executes recognition processing for the signal information when the signal recognition instruction receiving unit receives the instruction; and a display that displays start information indicating that the signal information recognizer starts the recognition processing for the signal information.

Still another aspect of the present invention provides an automatic driving control device. The automatic driving control device includes: a signal recognition instruction receiving unit that receives an instruction to recognize signal information in a traffic signal; a signal information recognizer that executes recognition processing for the signal information when the signal recognition instruction receiving unit receives the instruction; an image output unit that outputs start information indicating that the signal information recognizer starts the recognition processing for the signal information; and an automatic driving control unit that controls automatic driving of a vehicle based on a result of the recognition processing for the signal information.

Still another aspect of the present invention provides a vehicle. The vehicle includes a driving assistance device. The driving assistance device includes: a signal recognition instruction receiving unit that receives an instruction to recognize signal information in a traffic signal; a signal information recognizer that executes recognition processing for the signal information when the signal recognition instruction receiving unit receives the instruction; and an image output unit that outputs start information indicating that the signal information recognizer starts the recognition processing for the signal information.

Still another aspect of the present invention provides a driving assistance method. The driving assistance method includes: receiving an instruction to recognize signal information in a traffic signal; executing recognition processing for the signal information when the instruction is received; and outputting start information indicating that the recognition processing for the signal information is started.

The present invention is described above based on the exemplary embodiments. It will be understood by those skilled in the art that these exemplary embodiments are merely examples, other exemplary modifications in which components and/or processes of the exemplary embodiments are variously combined are possible, and the other exemplary modifications still fall within the scope of the present invention.

INDUSTRIAL APPLICABILITY

According to the present invention, the occupant of the vehicle can be notified of the action situation of the recognition processing for the signal information executed by the vehicle.

REFERENCE MARKS IN THE DRAWINGS 2 notification device
2a head-up display
2b center display
8 wireless device
30 automatic driving control device 31 control unit
32 storage unit
33 I/O unit
40 driving assistance device
41 control unit
42 storage unit
43 I/O unit
80 signal recognition instruction receiving unit
82 signal information recognizer
84 image generator
86 image output unit
100 vehicle

The invention claimed is:

1. A driving assistance device comprising:
a processor; and
a memory coupled to the processor, the memory storing a program that, when executed by the processor, causes the driving assistance device to:
receive an instruction to recognize signal information of a traffic signal;
execute recognition processing for the signal information after the instruction is received; and
output start information after the instruction is received and before a success or failure of the recognition processing is determined, the start information indicating that the recognition processing for the signal information is started.

2. The driving assistance device according to claim 1, wherein the program, when executed by the processor, causes the driving assistance device to:
output a result of the recognition processing for the signal information after outputting the start information.

3. The driving assistance device according to claim 2, wherein the program, when executed by the processor, causes the driving assistance device to:
receive driving behavior information of a vehicle, the driving behavior information being reflected by the result of the recognition processing for the signal information, and
output the driving behavior information of the vehicle.

4. The driving assistance device according to claim 1, wherein the signal information is externally input.

5. A driving assistance system comprising:
a processor;
a memory coupled to the processor, the memory storing a program that, when executed by the processor, causes the driving assistance system to:
receive an instruction to recognize signal information of a traffic signal; and
execute recognition processing for the signal information after the instruction is received; and
a display that displays start information after the instruction is received and before a success or failure of the recognition processing is determined, the start information indicating that the recognition processing for the signal information is started.

6. The driving assistance system according to claim 5, wherein the signal information is externally input.

7. A driving assistance method comprising:
receiving an instruction to recognize signal information of a traffic signal;
executing recognition processing for the signal information after the instruction is received; and
outputting start information after the instruction is received and before a success or failure of the recognition processing is determined, the start information indicating that the recognition processing for the signal information is started.

8. The driving assistance device according to claim 1, wherein the signal information is a first image indicating the traffic signal, and the program, when executed by the processor, causes the driving assistance device to:
output the first image to a notification device equipped in a vehicle where the driving assistance device is equipped,
after outputting the first image is started, a lighting state, indicated by the first image, is changed in response to a change of a result of the recognition processing.

9. The driving assistance device according to claim 8, wherein the program, when executed by the processor, causes the driving assistance device to:
generate a second image indicating a detected surrounding situation of the vehicle;
output the second image to the notification device; and
after the recognition processing for the signal information is started, generate the second image so that the first image is superposed on the second image.

10. The driving assistance device according to claim 9, wherein the program, when executed by the processor, causes the driving assistance device to:
receive driving behavior information of the vehicle, the driving behavior information being reflected by the result of the recognition processing for the signal information; and
generate the second image so that the driving behavior information is superposed on the second image, in response to the driving behavior information being received.

11. The driving assistance device according to claim 9, wherein a third image indicating the vehicle is included in the second image.

* * * * *